3,061,517
ANTIHISTAMINE COMPOSITION AND METHOD
Lewis A. Walter, Madison, N.J., assignor to Schering Corporation, Bloomfield, N.J., a corporation of New Jersey
No Drawing. Filed Feb. 16, 1962, Ser. No. 173,799
6 Claims. (Cl. 167—65)

This invention relates to certain novel optically active forms of phenyl-(2-pyridyl)-alkyl substituted tertiary amines, to processes for their preparation and to pharmaceutical compositions containing the same. More particularly, this invention relates to therapeutically active $d$-(+) forms of phenyl-(2-pyridyl)-alkyl substituted tertiary amines and certain halogen substituted derivatives thereof, to processes for isolating said $d$-(+) forms from racemic mixtures containing the same, to pharmaceutical compositions containing the same as an essential active component and to the method of employing said $d$-(+) forms in antihistaminic therapy.

This application is a continuation-in-part of my copending application Serial No. 718,991, filed March 4, 1958, now U.S. Patent 3,030,371, issued April 17, 1962.

Heretofore, racemates of certain members of this class of amines [e.g. $dl$-3-(2-pyridyl)-3-p-chlorophenyl-N,N-dimethyl-propylamine] have been known to be highly effective against histamine-induced allergic reactions, which are brought about by a large and varied number of causative agents. The antihistamine activity uniquely manifested by these substances coupled as it has been with a significant reduction is undesirable toxic reactions over those materials previously known, has represented a prominent but apparently conclusive achievement which wide and intensive study has hitherto failed to eclipse.

However, I have now succeeded in resolving these $dl$-phenyl-(2-pyridyl)-alkyl substituted tertiary amines as described hereinafter into their optically active $d$-(+) and $l$-(—) forms by reaction of the racemates with certain optically active acids, thus for the first time making these isomers available for therapeutic use; and for the first time substantially isolating and significantly increasing the antihistaminic activity in the $d$-isomers. These $d$-(+) forms normally and particularly provide markedly enhanced antihistaminic components substantially free of untoward side effects. These isomers can be employed pharmaceutically either in the form of a free base or in the form of their non-toxic acid addition salts as described hereinafter.

The pharmacologically active $d$-isomers of my invention are resolved from racemates of amine compounds of the following general formula:

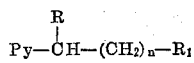

wherein Py is a pyridine radical; R is a phenyl nucleus; $R_1$ is a dialkylamino (preferably a lower dialkylamino), morpholino, piperidino, or pyrrolidino radical; and $n$ is an integer preferably of from two to three, inclusive, and not in excess of four. It should be understood that the phenyl nucleus referred to as R can contain one or more substituents such as lower alkyl, lower alkoxy, hydroxy, halogen (e.g., bromine, chlorine), amino, lower alkyl substituted amino, acylamino, nitro, carboxy and carbalkoxy radicals. Thus the term "phenyl nucleus" as employed throughout this specification is intended to embrace, unless otherwise explicitly indicated, these substituted derivatives as well.

The process of my invention comprises treating a $dl$-amine as described hereinabove with an optically active $d$- or $l$-isomer of a substituted succinic acid and most desirably a mono-substituted succinic acid wherein the substituent can, for example, be an aryl, lower alkoxy or halogen substituted aryl, thienyl, cycloalkyl, or alkyl radical, in the presence of an organic solvent, i.e. a non-reactive compatible solvent such as an aliphatic alcohol to cause the formation of the corresponding diastereoisomeric salts thereof, separating the salts so obtained by fractional crystallization, and releasing the desired $d$-isomers from the separated amine salts. In carrying out this process, it is normally preferable to use equivalent amounts of racemate and optically active acid. However, these proportions are in no way critical and mole ratios of amine racemate to optically active acid of 2:1 are wholly operative and indeed under certain circumstances preferred. It should be noted that it is significantly advantageous to employ either of the $d$- and $l$-isomers of phenylsuccinic acid as the resolving agent, particularly where it is sought to separate out the optical antipodes of halogenated racemates, such as for example, $dl$-3-(2-pyridyl)-3-p-chlorophenyl-N,N-dimethylpropylamine or $dl$-3-(2-pyridyl)-3-phenyl-N,N-dimethylpropylamine. The liberation of the isomeric free amine can be accomplished by the introduction of the isolated isomeric salt into aqueous alkali (e.g., sodium carbonate, potassium hydroxide, sodium hydroxide and the like) and a suitable selective organic solvent, that is a substantially water-immiscible solvent such as for example, diethyl ether, benzene, methyl isobutyl ketone, isopropyl acetate, isobutyl alcohol, sec. butyl alcohol and the like, in which the free amine base is soluble.

The $d$-optical isomers obtained in accordance with the practice of my invention are obtained in pure form and substantially free of their optical antipodes and can be reacted directly with suitable mineral and organic acids, such as, for example, hydrochloric acid, hydrobromic acid, sulfuric acid, phosphoric acid, tartaric acid, citric acid, succinic acid and most desirably maleic acid and gluconic acid preferably in equimolar amounts and in a suitable solvent to form the corresponding non-toxic, therapeutically useful acid addition salts thereof.

In addition, the therapeutic applications of the antihistaminic isomers of my invention, e.g. $d$-3-(2-pyridyl)-3-p-chlorophenyl-N,N-dimethylpropylamine and $d$-3-(2-pyridyl)-3-p-bromophenyl-N,N-dimethylpropylamine and $d$-3-(2-pyridyl)-3-phenyl-N,N-dimethylpropylamine, can be extended by reaction thereof with acidic xanthines and particularly haloxanthines to form the salts thereof. It should be noted that hitherto it has been suggested to employ various antihistamines in the form of their substituted xanthine salts to neutralize the untoward side effects of these former compounds. These undesirable reactions have been so substantially eliminated by the process of my invention and particularly in those antihistaminic $d$-isomers described immediately above as to render this conversion where performed for this reason alone essentially valueless. However, salts of these isomers, as well as others within the scope of this invention are so devoid of undesirable side effects that they are of particular and enhanced utility over compounds heretofore known.

Among these acidic xanthines which can be so employed are the chloro, bromo, and iodo derivatives of theophylline and related xanthines which have a hydrogen atom in the seven position. Illustrative of these xanthines are the following: 3-methyl-8-chloroxanthine, 8-chlorotheophylline, 8-bromotheophylline, 8-chloroxanthine, 8-iodo-1,3-diethylxanthine, 8-iodotheophylline, 1,3-diethyl-8-chloroxanthine, 1,3-diethyl-8-bromoxanthine and 8-bromoxanthine. Salts of the antihistaminic isomers of my invention and acidic xanthines can be prepared by forming a mixture of the isomer of the free amine and a haloxanthine preferably, although not necessarily, in approximately equivalent amounts, in a suitable polar solvent, such as for example, the lower alcohols, e.g., methanol, ethanol, and ketones, e.g., acetone, methylethyl ketone, and mixtures thereof with water; ethers, hydrocarbons and the like. The desired salt crystallizes out normally when the solution is chilled or upon standing at room temperature for more extended periods of time. This precipitation can be aided by the introduction of ether, benzene or like suitable organic solvent into this solution. By way of further illustration, approximately equivalent amounts of amine base and haloxanthine can be mixed with small amounts of water at temperatures in the range of 45° C. to 100° C. to cause the formation of a thick paste or granular material, which upon chilling becomes solid, and can be broken up, and ground to a powder which is then dried.

The preferred optically active isomers obtained in accordance with the practice of my invention are d-3-(2-pyridyl)-3-p-chlorophenyl-N,N-dimethylpropylamine, d-3-(2-pyridyl)-3-p-bromophenyl-N,N-dimethylpropylamine and d-3-(2-pyridyl)-3-phenyl-N,N-dimethylpropylamine.

The d-isomers of my invention either as the free base or in the form of a non-toxic salt thereof e.g., maleate, gluconate, theophyllinate etc. can be administered orally in the form of tablets, elixirs, capsules and the like. In tablet form, they are compounded with an inert carrier which may contain a suitable binder, such as, for example, gums, starches and sugars. It may also be incorporated into a gelatin capsule, and it can also be formulated into elixirs which have the advantage of being susceptible to manipulations in flavor by the addition of standard natural or synthetic flavoring materials. Where desired, the isomers of my invention and their corresponding salts can be administered parenterally by incorporation thereof into suitable injectable solutions employing such non-toxic carriers, as for example, water, propylene glycol, polyethylene glycol and the like. They can also be formulated into topical ointments, creams and the like when topical application to the skin or mucosa is the preferred mode of administration. Similarly they may be employed in standard formulations for ear and ophthalmic suspensions. Where oral or parenteral administration of the halogenated antihistamines, e.g., d-3-(2-pyridyl)-3-p-chlorophenyl-N,N-dimethylpropylamine and d-3-(2-pyridyl)-3-p-bromophenyl-N,N-dimethylpropylamine, and their non-toxic salts is undertaken, total daily dosages of from about 5 mg. to 50 mg. are desirable; with the nonhalogenated antihistaminic derivative, d-3-(2-pyridyl)-3-phenyl-N,N-dimethylpropylamine, a daily oral or parenteral dosage in the range of 25 mg. to 200 mg. is preferred. For topical application or use in nasal sprays or ear and ophthalmic suspensions daily applications of the halogenated antihistaminic compounds in a dosage range of 0.25 percent (2.5 mg./ml.) to 2.0 percent (20.0 mg./ml.) and more are acceptable, and in the case of the nonhalogenated form, up to 5 percent (50 mg./ml.) is often preferred.

The d-isomers of the non-halogenated compounds of my invention, such as, for example, d-3-(2-pyridyl)-3-phenyl-N,N-dimethylpropylamine can, in addition to being prepared from the corresponding racemic mixture as described herein, be produced by the dehalogenation of the corresponding halogen (e.g. bromine, chlorine) substituted phenyl optical isomers. This dehalogenation step is desirably accomplished by standard catalyticdehalogenation procedures. An illustrative method comprises forming a mixture of the halogenated amine dissolved in a suitable solvent (i.e., an aliphatic alcohol) and preferably in the presence of at least an equivalent amount of mineral acid (e.g., hydrochloric acid, hydrobromic acid, phosphoric acid) or organic acid, (e.g. acetic acid, propionic acid and the like) with palladium on charcoal in the presence of hydrogen and preferably in a closed vessel.

Further illustrative of the optically active isomers prepared according to the practice of my invention are: d-3-(2-pyridyl)-3-p-bromophenyl-1-pyrrolidinopropane, d-3-(2-pyridyl)-3-p-bromophenyl-1-morpholinopropane, d-3-(2-pyridyl)-3-p-chlorophenyl-1-pyrrolidinopropane, d-3-(2-pyridyl)-3-p-chlorophenyl-1-piperidinopropane, and d-3-(2-pyridyl)-3-p-chlorophenyl-1-morpholinopropane.

Examples of the optically active substituted succinic acids which can be employed in the practice of my invention are the d- and l-isomers of each of the following: o-chlorophenylsuccinic acid, p-nitrophenyl succinic acid, p-methoxyphenylsuccinic acid, α-2-thienylsuccinic acid, monobenzylsuccinic acid, methylsuccinic acid, butylsuccinic acid, ethylsuccinic acid, propylsuccinic acid, cyclopentylsuccinic acid, and preferably as noted above, phenylsuccinic acid.

The non-reactive organic solvent employed herein to effect the desired resolution of optical isomers is not narrowly critical and while aliphatic alcohols such as isopropyl alcohol, isobutyl alcohol, n-butyl alcohol, secondary butyl alcohol, and particularly ethanol (i.e. absolute and aqueous solutions thereof wherein water can be present in concentration of up to 20 percent and more) are preferred, other solvents and combinations thereof are wholly operative. (Percentages referred to herein unless otherwsie explicitly indicated refer to percentages by weight.) Thus, for example, ketones (e.g. acetone, methylethyl ketone), esters (e.g., isopropyl acetate, ethyl acetate, butyl acetate), nitriles (e.g. acetonitrile, propionitrile) and the like can also be employed.

It should be noted that while the process of my invention is normally carried out between about 20° C. and 100° C. higher and lower temperatures can also be used. Generally, temperatures in excess of about 100° C., should not be used since they tend to have a deteriorative effect on the resolved isomers thereof.

The following examples are further illustrative of the invention.

Example 1

Twenty grams of d-phenylsuccinic acid and 28 g. of 3-(2-pyridyl)-3-p-chlorophenyl-N,N-dimethylpropylamine are dissolved in 400 ml. of absolute ethyl alcohol and allowed to stand at room temperature until crystallization is effected. The crystals are filtered, washed with absolute ethyl alcohol and recrystallized from 300 ml. of this solvent in the same manner. The crystals so obtained are recrystallized twice from 80% ethyl alcohol using 3.5 ml. per gram of compound in the same manner as described above and pure d-3-(2-pyridyl)-3-p-chlorophenyl-N,N-dimethylpropylamine-d-phenylsuccinate is obtained, melting point (M.P.) 145–147°, (specific optical rotation at 25° C.) $[\alpha]_D^{25}$ (+)98.7 (conc., 1% in dimethylformamide). This salt is shaken with 100 ml. of diethyl ether and 50 ml. of 20% aqueous potassium carbonate; the ether layer is separated, dried over anhydrous potassium carbonate, filtered and the ether is removed in vacuo. The d-3-(2-pyridyl)-3-p-chlorophenyl-N,N-dimethylpropylamine so obtained is a mobile oil; $[\alpha]_D^{25}$ (+)49.8 (conc., 1% in dimethylformamide).

4.3 g. of the above base and 1.8 g. of maleic acid are dissolved in 20 ml. of isopropyl acetate and kept at room temperature until crystallization is complete. The crystals are filtered, washed with ethyl acetate and recrystallized from 15 ml. of this solvent in the same manner. The crystalline d-3-(2-pyridyl)-3-p-chlorophenyl-N,N-dimethylpropylamine maleate so formed is then filtered off and dried. M.P. 113–115° C., $[\alpha]_D^{25}$ (+)44.3 (conc., 1% in dimethylformamide).

Example 2

Sixteen grams of racemic 3-(2-pyridyl)-3-p-bromophenyl-N,N-dimethylpropylamine and 9.7 g. of d-phenylsuccinic acid are dissolved in 150 ml. of absolute alcohol and kept at room temperature until crystallization is effected. The crystals are filtered, washed with absolute ethyl alcohol, and recrystallized from the same solvent using 5 ml. thereof per gram of solid. Three subsequent crystallizations from 80% alcohol give d-3-(2-pyridyl)-3-p-bromophenyl-N,N-dimethylpropylamine-d-phenylsuccinate; M.P. 152–154° C.; $[\alpha]_D^{25}$ 91 (conc., 1% in dimethylformamide).

The free base, d-3-(2-pyridyl)-3-p-bromophenyl-N,N-dimethylpropylamine, is obtained from this salt with diethyl ether and aqueous potassium carbonate as described in Example 1; $[\alpha]_D^{25}$ +42.7 (conc., 1% in dimethylformamide).

Example 3

Ten grams of d-3-(2-pyridyl)-3-p-bromophenyl-N,N-dimethylpropylamine and 5.5 g. of d-glucono-α-lactone are mixed in 50 ml. of 50% aqueous alcohol and kept at 50° C. for two hours. The solvent is then removed in a vacuum and the desired salt, d-3-(2-pyridyl)-3-p-bromophenyl-N,N-dimethylpropylamine-d-gluconate, remains as as colorless viscous oil.

Example 4

Twenty-four grams of racemic 3-(2-pyridyl)-3-phenyl-N,N-dimethylpropylamine and 19.4 g. of d-phenylsuccinic acid are dissolved in 200 ml. absolute isopropanol and kept at room temperature until crystallization is effected to yield d-3-(2-pyridyl)-3-phenyl-N,N-dimethylpropylamine-d-phenylsuccinate. The crystals are filtered, washed with the same solvent and recrystallized as described in Example 1 using 5 ml. of solvent per gram of crystalline solid. Recrystallization is repeated until the $[\alpha]_D^{25}$ is +105.9 (conc., 1% in dimethylformamide); M.P. 118–120° C.

Example 5 d-3-(2-pyridyl)-3-phenyl-N,N-dimethylpropylamine is also prepared by catalytic dehalogenation of the optically active base from Example 1.

Fifteen grams of d-3-(2-pyridyl)-3-p-chlorophenyl-N,N-dimethylpropylamine, 150 ml. of methanol containing 10 cc. of glacial acetic acid and 3 g. of 5% palladium on charcoal catalyst are shaken under hydrogen at 50 p.s.i. until the theoretical pressure drop is obtained. The catalyst is filtered, the solvent removed in vacuo and the residue is shaken with excess 20% aqueous potassium carbonate and ether. The ether is separated, dried over anhydrous potassium carbonate, filtered and evaporated to leave d-3-(2-pyridyl)-3-phenyl-N,N-dimethylpropylamine, $[\alpha]_D^{25}$ +64.4, c.=1% in dimethylformamide.

Example 6

Twelve grams of d-p-nitrophenylsuccinic acid (obtained by nitrating d-phenylsuccinic acid with fuming nitric acid at 0° C.) and 12 g. of racemic 3-(2-pyridyl)-3-phenyl-N,N-dimethylpropylamine are dissolved in 200 ml. 95% alcohol and then kept at room temperature until crystallization is complete. The crystals of d-3-(2-pyridyl)-3-phenyl-N,N-dimethylpropylamine-d-p-nitrophenylsuccinate are filtered off, washed with alcohol and recrystallized from this solvent until pure.

The salt is filtered and shaken with 100 ml. of diethyl ether and 50 ml. of 20% aqueous potassium carbonate; the ether layer is separated, dried over anhydrous potassium carbonate, filtered and the ether removed on a steam bath. The product obtained is a mobile oil, d-3-(2-pyridyl)-3-phenyl-N,N-dimethylpropylamine.

Example 7

Twenty-three grams of d-o-chlorophenylsuccinic acid and 28 g. of 3-(2-pyridyl)-3-p-chlorophenyl-N,N-dimethylpropylamine are dissolved in 300 ml. of absolute alcohol and allowed to stand at room temperature overnight. The crystals are filtered off, washed with absolute alcohol and recrystallized four times from this solvent in the same manner to give d-3-(2-pyridyl)-3-p-chlorophenyl-N,N-dimethylpropylamine-d-o-chlorophenylsuccinate.

The salt is filtered and shaken with 100 ml. of diethyl ether and 50 ml. of 20% aqueous potassium carbonate; the ether layer is separated dried over anhydrous potassium carbonate; filtered and the ether removed on a steam bath. The product obtained is a mobile oil, d-3-(2-pyridyl)-3-p-chlorophenyl-N,N-dimethylpropylamine.

Example 8

Ten grams of d-3-(2-pyridyl)-3-p-chlorophenyl-N,N-dimethylpropylamine and 6.5 g. of d-glucono-α-lactone are mixed in 50 ml. of 50% aqueous alcohol and kept at 50° C. for two hours. The solvent is then removed in a vacuum to leave the desired salt, d-3-(2-pyridyl)-3-p-chlorophenyl-N,N-dimethylpropylamine-d-gluconate, as a viscous colorless oil.

Example 9

Twenty-one grams of d-benzylsuccinic acid and 27.6 g. of 3-(2-pyridyl)-3-p-chlorophenyl-N,N-dimethylpropylamine are dissolved in 175 ml. of absolute alcohol and allowed to crystallize at room temperature. After several of such crystallizations pure d-3-(2-pyridyl)-3-p-chlorophenyl-N,N-dimethylpropylamine-d-benzylsuccinate is obtained.

The salt is filtered and shaken with 100 ml. of diethyl ether and 50 ml. of 20% aqueous potassium carbonate; the ether layer is separated, dried over anhydrous potassium carbonate, filtered and the ether removed on a steam bath. The product obtained is a mobile oil, d-3-(2-pyridyl)-3-p-chlorophenyl-N,N-dimethylpropylamine.

Example 10

A mixture of 15 grams of d-3-(2-pyridyl)-3-p-chlorophenyl-N,N-dimethylpropylamine and 12 grams of 8-bromotheophylline are dissolved in 75 cc. of hot alcohol and 25 cc. of hot water. The solution thus formed is cooled and diethyl ether is added to cause the separation out of a light viscous water-soluble oil, d-3-(2-pyridyl)-3-p-chlorophenyl-N,N-dimethylpropylamine-8-bromotheophyllinate. The theophyllinate salt is separated from the solution and dried at about 65° C. for several days after which period of time the salt has partially crystallized. Crystallization is further effected by drying in a desiccator at room temperature.

Example 11

The 8-bromotheophylline salt of d-3-(2-pyridyl)-3-phenyl-N,N-dimethylpropylamine is prepared according to the method described in Example 1 employing 13.5 g. of d-3-(2-pyridyl)-3-phenyl-N,N-dimethylpropylamine and 12 g. of 8-bromotheophylline in 100 cc. of boiling methylethyl ketone containing 5 cc. of water. This solution is filtered, evaporated and triturated with chilled diethyl ether to yield the desired salt.

What is claimed is:

1. A pharmaceutical composition for antihistaminic therapy comprising the optically active d-isomer of a compound selected from the group consisting of a free amine and a non-toxic acid addition salt thereof having the formula:

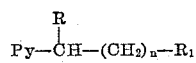

wherein Py is pyridine; R is a phenyl group; $R_1$ is a member of the group consisting of dialkylamino, pyrrolidino, morpholino, and piperidino; and n is an integer of from 2–4, said isomer being substantially free of its optical antipode, and a pharmaceutical carrier.

2. The composition of claim 1 wherein the optically active d-isomer is d-3-(2-pyridyl)-3-p-chlorophenyl-N,N-dimethylpropylamine.

3. The composition of claim 1 wherein the optically active d-isomer is d-3-(2-pyridyl)-3-p-bromophenyl-N,N-dimethylpropylamine.

4. The process of producing an antihistaminic effect which comprises administering to a host suffering from a histamine induced allergic reaction an optically active d-isomer of a compound selected from the group consisting of a free amine and a non-toxic acid addition salt thereof having the formula:

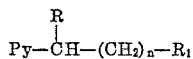

wherein Py is pyridine; R is a phenyl group; $R_1$ is a member of the group consisting of dialkylamino, pyrrolidino, morpholino and piperidino; and $n$ is an integer of from 2–4, said isomer being substantially free of its optical antipode.

5. The process of claim 4 wherein the optically active d-isomer is d-3-(2-pyridyl)-3-p-chlorophenyl - N,N - dimethylpropylamine.

6. The process of claim 4 wherein the optically active d-isomer is d-3-(2-pyridyl)-3-p-bromophenyl - N,N - dimethylpropylamine.

References Cited in the file of this patent

UNITED STATES PATENTS 3,030,371 Walter _____ Apr. 17, 1962

OTHER REFERENCES

"Disomer" (White), Trademary #686,206, registered Oct. 6, 1959.

"Polaramine" (Schering), Trademark #677,256, registered Apr. 21, 1959.